3,322,859
THERMOPLASTIC RESINOUS PRODUCTS
CONTAINING FLAME RETARDANTS
Allan Ellis Sherr, Norwalk, and Helen Currier Gillham, Stamford, Conn., assignors to American Cyanamid Company, Stamford, Conn., a corporation of Maine
No Drawing. Filed Dec. 26, 1963, Ser. No. 333,652
8 Claims. (Cl. 260—893)

This invention relates to flame-retardant compositions. More particularly, this invention relates to flame-retardant compositions comprising thermoplastic polymers containing a flame-retarding amount of a compound having the formula

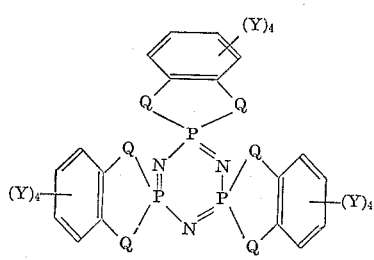

where Q represents oxygen or sulfur and Y represents hydrogen, bromine or chlorine.

The use of various materials incorporated into thermoplastic resins in order to improve the flame retardance thereof has been known in the prior art. Many compounds are commercially available for such a use, among them being chlorostyrene copolymers, chlorinated paraffin wax in admixture with triphenyl stibine, chlorinated paraffins and aliphatic antimonyl compounds, as well as antimony oxide-chlorinated hydrocarbon mixtures. A drawback of these compounds, however, has been the fact that generally a large amount, i.e. upwards of 35%, of additive must be incorporated into the resin in order to make it sufficiently flame retardant. Also these prior art additives tend to crystallize or oil out of the resin after a relatively short time of incorporation. We have now found a group of compounds which may be added to thermoplastic resins in relatively small amounts and still result in the production of satisfactory flame retardant compositions and which will not crystallize or oil out of the resin after incorporation therein.

The production of thermoplastic resin compositions which are flame retardant, i.e. have high resistance to burning, is of considerable commercial importance. For example, such articles as castings, moldings, foamed or laminated structures and the like are required, or at least desired, to be resistant to fire and flame and to possess the ability to endure heat without deterioration. Typical illustrations of such applications can be found in castings for live electrical contacts which should not be ignited or deteriorated by heat and sparks. Structural members such as pipes, wall coverings, wall paneling, windows and items such as ash trays, waste baskets, fibers and the like are further examples of products wherein flame retardance is desirable.

It is therefore an object of the present invention to provide novel flame retardant thermoplastic resin compositions.

It is a further object of the present invention to provide flame retardant compositions comprising thermoplastic polymers and a flame-retarding amount of a compound represented by Formula I, above.

These and further objects will become more apparent to those skilled in the art upon reading the more detailed description set forth hereinbelow.

The thermoplastic polymers

The theromplastic polymers into which the flame retardant agents may be incorporated to produce the novel compositions of the present invention, are generally the vinyl type polymers wherein the monomeric material is polymerized, by any known method, via the vinyl unsaturation therein. Examples of the vinyl type polymers which may be used to form our novel compositions are the vinyl halides, the vinylidene halides, the vinyl acetates, polyvinyl butyral, butadiene copolymers, acrylonitrile-butadiene-styrene polymers, the acrylonitriles, etc. Additionally and preferably, one may incorporate the flame retardant agents mentioned above into such polymers as the α-olefin polymers, such as the homopolymers and copolymers etc. containing, as the major constituent, ethylene, propylene, and the like and acrylates and methacrylate polymers produced from monomers having the formula (II)

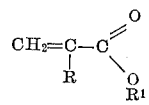

wherein R is a hydrogen or methyl radical and $R^1$ is a hydrogen or an alkyl radical having from 1 to 6 carbon atoms, inclusive. Examples of monomers represented by Formula II include acrylic acid, methacrylic acid, methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate and their corresponding alkyl methacrylates.

Additional examples of monomers which may be used to form the thermoplastic vinyl polymers encompassed by the present invention, polymerized either singularly or in combination with each other or with the other compounds set forth hereinabove, are such monomers as the unsaturated alcohol esters, more particularly, the allyl, methallyl, vinyl, methvinyl, butenyl, etc., unsaturated esters of aliphatic and aromatic monobasic acids such, for instance, as acetic, propionic, butyric, crotonic, succinic, glutaric, adipic, maleic, fumaric, itaconic benzoic phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic acids illustrative examples of which appear above; vinyl cyclic compounds (including monovinyl aromatic hydrocarbons), e.g. styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl pyridine, divinyl benzene, diallyl benzene, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc. and ethylene.

Other examples of monomers that can be used as polymers to form the resin portion of our novel flame-retardant compositions are the vinyl halides, more particularly, vinyl fluoride, vinyl chloride, vinyl bromide, and vinyl iodide, and the various vinylidene compounds, including the vinylidene halides, e.g., vinylidene chloride, vinylidene bromide, vinylidene fluoride, and vinylidene iodide, other comonomers being added, if needed, in order to improve the compatibility and copolymerization characteristics of the mixed monomers.

More specific examples of allyl compounds that can be polymerized to useful polymers, useful in the production of our novel flame-retardant compositions, are allyl alcohol, methallyl alcohol, diallyl carbonate, allyl lactate, allyl alphahydroxyisobutyrate, allyl trichlorosilane, diallyl phthalate, diallyl methylgluconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl isocyanurate, triallyl citrate, triallyl phosphate, tetrallyl silane, tetrallyl silicate, hexallyl disiloxane, allyl diglycol carbonate, etc. Other examples of allyl compounds that may be employed are given, for example, in U.S. Patent No. 2,510,503, issued June 6, 1950.

These above mentioned monomers may be polymerized, copolymerized, etc., in any known manner such as by free-radical generating catalysts, irradiation, anion and cation type catalysts and the like, said method of polymerization forming no part of the present invention.

*The flame retardant additives*

As mentioned above, we have discovered that various compounds represented by Formula I, above, which are stable to processing conditions, may be added to a thermoplastic resin to produce resinous compositions having excellent flame-retardant properties. These compounds may be incorporated into the thermoplastic resins in flame-retarding amounts, i.e. generally amounts ranging from about 10%, by weight, to about 35%, by weight, preferably 15% to 25%, by weight, based on the weight of the polymer, have been found sufficient.

The flame-retardant compounds or additives may be incorporated into the resins by any known method. That is to say, the flame retardant additive may be added to the resin by milling the resin and the additive on, for example, a two-roll mill, or in a Banbury mixer etc., or it may be added by molding or extruding the additive and resin simultaneously, or by merely blending it with the resin in powder form and thereafter forming the final desired article. Additionally, the flame-retardant may be added during the resin manufacture, i.e., during the polymerization procedure by which the resin is made, provided the catalyst etc. and other ingredients of the polymerization system are inert thereto.

The flame retardant additives set forth hereinabove may be produced in any known manner without varying from the scope of the present invention. An exemplary procedure for the production of compounds of this type comprises reacting a compound of the formula

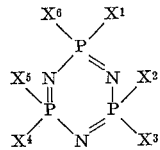

wherein $X^1$–$X^6$ each represent chlorine or bromine, with a compound of the formula

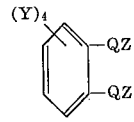

wherein Z represents hydrogen or an alkali metal and Q and Y are as set forth above in regard to Formula I, to produce the desired compounds.

The reaction is preferably conducted in the presence of an organic solvent and a salt-forming base at temperatures ranging from about 0° C. to about 200° C. at atmospheric pressure. A further and more complete description of the method for the production of the flame-retarding additives used to produce our novel compositions is set forth in abandoned application Ser. No. 264,763, filed Mar. 13, 1963, to Reaction of Phosphonitrilic Chloride Trimer With Catechol, by Harry Rex Allcock, and said application is hereby incorporated herein by reference. It should be understood, however, that said procedure forms no part of the present invention.

Examples of compounds which may be incorporated into thermoplastic resins to produce our novel flame-retardant compositions according to the present invention include trispiro[1,3,5,2,4,6-triazatriphosphorine-2,2':4,2":6, 2'''-tris[1,3,2]benzodioxaphosphole],
trispiro[1,3,5,2,4,6-triazaphosphorine-2,2':4,2":6, 2'''-tris[1,3,2]benzodithiaphosphole],
dodecachlorotrispiro[1,3,5,2,4,6-triazatriphosphorine-2,2':4,2":6,2'''-tris-[1,3,2]benzodioxaphosphole],
dodecachlorotrispiro-[1,3,5,2,4,6-triazaphosphorine-2,2':4,2":6,2'''-tris[1,3,2]-benzodithiaphosphole],
dodecabromotrispiro[1,3,5,2,4,6-triazatriphosphorine-2,2':4,2":6,2'''-tris[1,3,2]benzodioxaphosphole],
dodecabromotrispiro[1,3,5,2,4,6-triazaphosphorine-2,2':4,2":6,2'''-tris[1,3,2]benzodithiaphosphole]
and the like.

It should be noted that it is also within the scope of the present invention to incorporate such ingredients as plasticizers, dyes, pigments, stabilizers, antioxidants, antistatic agents and the like to our novel compositions.

The following examples are set forth for purposes of illustration only and are not to be construed as limitations on the present invention except as set forth in the appended claims. All parts and percentages are by weight unless otherwise specified.

Any appropriate flame retardance test may be used to determine the flame retardance properties of any specific compound. One test which is reasonably efficient is that designated as a modified version of ASTM test D–635–56T. The specifications for this test are: a specimen, 5" in length, 0.5" in width and 0.045" in thickness, is marked at the 1" and 4" lengths and is then supported with its longitudinal axis horizontal and its transverse axis inclined at 45° to the horizontal. A Bunsen burner with a 1" blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If, after the two burnings, the strip is not burned to the 4" mark, the specimen is designated as "self-extinguishing" or "flame-retardant."

*Example 1*

Eighty (80) parts of polyethylene and twenty (20) parts of trispiro[1,3,5,2,4,6 - triazatriphosphorine - 2,2' 4,2":6,2'''-tris[1,3,2]benzodioxaphosphole] are milled together on a two roll mill at about 170° C. The resulting milled composition is molded into strips 5" in length, 0.5" in width and 0.45" in thickness and said strips are then subjected to an art recognized flame-retardance test. The strips pass the test and are therefore designated as flame-retardant.

Following the procedure of Example 1, the following examples were carried out utlizing other flame retardant agents and various thermoplastic resin polymers. The results of these examples are set forth in Table I below. In each instance the resultant composition passed the flame retardance test and was designated as flame and fire retardant. In the table, PE=polyethylene; PP=polypropylene; PMMA=poly(methyl methacrylate); PA= poly(acrylic acid); AN=acrylonitrile; ST=styrene; and BD=butadiene; MMA=methyl methacrylate.

TABLE I

| Ex. | Additive Q | Additive Y | Thermoplastic Resin | Percent Additive |
|---|---|---|---|---|
| 2 | S | H | PE | 20 |
| 3 | O | Cl | PE | 25 |
| 4 | O | Br | PE | 20 |
| 5 | S | Cl | PE | 25 |
| 6 | S | Br | PE | 15 |
| 7 | O | H | PP | 20 |
| 8 | O | Cl | PP | 20 |
| 9 | O | Br | PP | 20 |
| 10 | S | H | PP | 25 |
| 11 | S | Cl | PP | 20 |
| 12 | S | Br | PP | 15 |
| 13 | O | H | PMMA | 20 |
| 14 | O | Cl | PMMA | 15 |
| 15 | O | Br | PMMA | 15 |
| 16 | S | H | PMMA | 25 |
| 17 | S | Cl | PMMA | 20 |
| 18 | S | Br | PMMA | 20 |
| 19 | O | H | Mixture of BD-AN (10-75%) and AN-ST (25-90%).* | 25 |
| 20 | O | Cl | ----do---- | 30 |
| 21 | O | Br | ----do---- | 30 |
| 22 | S | H | ----do---- | 20 |
| 23 | S | Cl | ----do---- | 25 |
| 24 | S | Br | ----do---- | 25 |
| 25 | O | H | PA | 25 |
| 26 | S | H | MMA/AN/ST 71/19/10 terpolymer. | 20 |

*=U.S. Patent No. 2,439,202.

We claim:
1. A flame-retardant composition comprising a thermoplastic polymer of an ethylenically unsaturated monomer and a flame retarding amount of a compound having the formula

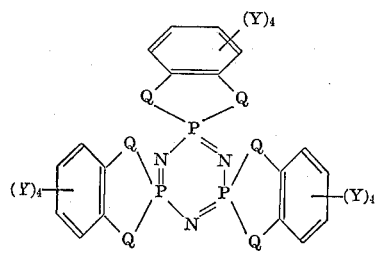

wherein Q is selected from the group consisting of oxygen and sulfur and Y is selected from the group consisting of hydrogen, bromine and chlorine.

2. A flame-retardant composition according to claim 1 wherein said thermoplastic polymer is a polymer of an α-olefin.

3. A flame-retardant composition according to claim 1 wherein said thermoplastic polymer is polyethylene.

4. A flame-retardant composition according to claim 1 wherein the thermoplastic polymer is a polymer of a compound having the formula

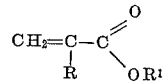

wherein R is selected from the group consisting of hydrogen and a methyl radical and $R^1$ is selected from the group consisting of hydrogen and an alkyl radical having from 1 to 6 carbon atoms, inclusive.

5. A flame-retardant composition according to claim 1 wherein the thermoplastic polymer is poly(methyl methacrylate).

6. A flame-retardant composition according to claim 1 wherein the thermoplastic polymer is a mixture of (A) a butadiene-acrylonitrile copolymer and (B) an acrylonitrile-styrene copolymer, the amount of A and B ranging from about 10–75% to 90–25%, by weight, respectively.

7. A flame-retardant composition according to claim 1 wherein said compound is trispiro[1,3,5,2,4,6-triazatriphosphorine - 2,2′:4,2″:6,2‴-tris[1,3,2]benzodioxaphosphole].

8. A flame-retardant composition according to claim 1 wherein said compound is trispiro[1,3,5,2,4,6-triazatriphosphorine - 2,2′:4,2″:6,2‴-tris[1,3,2]benzodithiaphosphole].

References Cited
UNITED STATES PATENTS

| | | | |
|---|---|---|---|
| 2,681,295 | 6/1954 | Hamalainen | 260—927 |
| 2,876,248 | 3/1959 | Ratz et al. | 260—927 |
| 3,131,207 | 4/1964 | Ratz | 260—927 |
| 3,240,728 | 3/1966 | Lund | 260—2.5 |

MURRAY TILLMAN, *Primary Examiner.*
GEORGE F. LESMES, *Assistant Examiner.*